US007738273B2

(12) United States Patent
Deguchi

(10) Patent No.: US 7,738,273 B2
(45) Date of Patent: Jun. 15, 2010

(54) CONNECTOR DEVICE AND POWER DETECTING APPARATUS UTILIZING THE SAME

(75) Inventor: Yoshiaki Deguchi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 278 days.

(21) Appl. No.: 11/907,785

(22) Filed: Oct. 17, 2007

(65) Prior Publication Data

US 2008/0096427 A1 Apr. 24, 2008

(30) Foreign Application Priority Data

Oct. 18, 2006 (JP) ............................ 2006-283207

(51) Int. Cl.
*H02M 1/00* (2007.01)
*H01R 27/00* (2006.01)

(52) U.S. Cl. ...................................... 363/144; 439/220

(58) Field of Classification Search .................. 363/50, 363/52, 53, 144, 146; 439/93, 101, 192, 439/194, 218, 220, 611, 613; 315/306, 310
See application file for complete search history.

(56) References Cited

U.S. PATENT DOCUMENTS 5,847,512 A * 12/1998 Baba et al. .................... 315/51
6,152,568 A * 11/2000 Baba et al. .................... 362/23
6,716,042 B2 * 4/2004 Lin ............................ 439/110

FOREIGN PATENT DOCUMENTS

DE 299 10 888 U1 11/1999
JP 07022001 1/1995
JP 2006-011085 1/2006

OTHER PUBLICATIONS

Davis, Dana, "Overload and Reverse-Current Circuitry Protects Battery and Load", www.edn.com/archves/1996/030196/05df3.htm, Mar. 1, 1996. five (5) pages.

* cited by examiner

*Primary Examiner*—Matthew V Nguyen
(74) *Attorney, Agent, or Firm*—Morgan Lewis & Bockius LLP

(57) ABSTRACT

A connector device in accordance with the present invention includes a first connecting portion and a second connecting portion, the first connecting portion has a power input terminal and an input side ground terminal, and the second connecting portion has a power output terminal and an output side ground terminal. The power input terminal and the power output terminal are connected by a first connecting line, the input side ground terminal and the output side ground terminal are connected by a second connecting line, and the first connecting line and the second connecting line are connected via a rectifier element which passes current only in a direction from the second connecting line to the first connecting line. As a result the connector device can prevent input of power having an inverse direction to an electric load even when the power having the inverse direction is output from the power output device side to the electric load side.

8 Claims, 3 Drawing Sheets

CONNECTOR DEVICE AND POWER DETECTING APPARATUS UTILIZING THE SAME

This application is based on Japanese Patent Application No. 2006-283207 filed on Oct. 18, 2006, and the contents of which are hereby incorporated by reference.

BACKGROUND OF THE INVENTION

1. Field of the Invention

The present invention relates to a connector device which connects a power output device and an electric load each other and the present invention also relates to a power detecting apparatus utilizing the same.

2. Description of the Related Art

Conventionally, a power confirming test has been widely performed as one part of quality control in a production process of a product which corresponds to an electric load such as a direct current (DC) lamp for a projector or the like, for example. The power confirming test is performed for judgment whether quality of the product is good or bad by supplying a prescribed power to the electric load on a trial basis and by confirming a state of power at the same time.

As one example of embodiment of the above described power confirming test, an explanation will be given concretely on the power confirming test which is performed for a DC lamp that is an electric load with reference to FIG. 4. As shown in the diagram a power detecting apparatus 101 to perform the power confirming test includes a power supply 111 and a power meter 112. These are connected to each other via a power line (Ballast +Line) and a ground line (Ballast −Line). Further, the power meter 112 includes a connector 112*a* for connecting with a measuring object. In addition, a connector 102*a* to receive DC power is included in the DC lamp 102 being the measuring object.

At this point, respective connectors (102*a*, 112*a*) have positive (+) terminal which is the terminal in the power line side and negative (−) terminal which is the terminal in the ground line side. When the connectors 102*a* and 112*a* are connected, the positive terminal is connected with the positive terminal and the negative terminal is connected with the negative terminal surely by a locating lug and locating recess alternatively formed on the connectors.

By this kind of structure, it becomes possible to judge whether quality of the DC lamp 102 is good or bad by supplying a power from the power supply 111 with connecting the connector 112*a* of the power detecting apparatus 101 to the connector 102*a* of the DC lamp 102 and by confirming a state of power at the time utilizing the power meter 112. To be more concrete, when detected result of the power meter 112 is extraordinary, i.e., the result is not within a normal range, for example, it is recognized that resistance value of the DC lamp is extraordinary, and as a result it is decided that the DC lamp 102 is not a good product. Conversely, when the detected result is normal, it is decided that the DC lamp 102 is a good product. As for the conventional technology, it is recommended to refer to JP-A-2006-011085 and the like.

In the electric load such as the DC lamp, a direction in which the power should be input has been defined. When power having an inverse direction is input, i.e., power having a direction from the negative terminal to the positive terminal, there may be a possibility that problem is caused such that the lamp is broken or the like. At this point it makes to prevent the input of power having the inverse direction to the DC lamp as much as possible by the configuration in which the positive terminal is connected with the positive terminal and the negative terminal is connected with the negative terminal in each connector as above described.

However, by any cause there is a possibility of a situation that the power having the inverse direction is output from the power detecting apparatus side, that is to say, the power is output from the negative terminal side of the above described connector 112*a*. One example of it is that there is a possibility that the connector 112*a* deteriorates because it is necessary that the connector 112*a* is repeated to connect and disconnect with the connector 102*a* of many DC lamps in the above described power detecting apparatus 101.

At that time when the connector 112*a* is disconnected at point P which is shown by dotted line in FIG. 4, for example, in order to exchange for new connector 112*a* to be connected to main body of the power meter for repairing, it is conceivable that the new connector 112*a* is connected in reversed manner by mistake. If so, the power is output from the negative terminal side of the connector 112*a* as a result.

When the power confirming test for the DC lamp is performed in such a case, there is a possibility that the DC lamp is broken as above described. Even if the DC lamp is not broken, there is still a possibility that the DC lamp which has been damaged is shipped as a product and it is also conceivable that defective goods occur often at a later time, the damage of it becomes extensive.

SUMMARY OF THE INVENTION

The present invention is made to solve the above described problem, and it is one object of the present invention to provide a connector device which can prevent input of the power having an inverse direction to the electric load even when the power having the inverse direction is output from the power output device side to the electric load side. Further, it is another object of the present invention to provide a power detecting apparatus which can utilize effectively the connector device as above described.

To attain the above described first object a connector device for connecting a power output device and an electric load each other in accordance with a first aspect of the present invention includes: a first connecting portion to which the power output device having an output terminal to output a prescribed power and a ground terminal is connected; a second connecting portion to which the electric load having a positive terminal and a negative terminal is connected, and the connector device is characterized by a structure in which the first connecting portion has a power input terminal to which the output terminal is connected and an input side ground terminal to which the ground terminal is connected respectively, the second connecting portion has a power output terminal to which the positive terminal is connected and an output side ground terminal to which the negative terminal is connected respectively, the power input terminal and the power output terminal are connected by a first connecting line, the input side ground terminal and the output side ground terminal are connected by a second connecting line, and the first connecting line and the second connecting line are connected via a rectifier element which passes current only in a direction from the second connecting line to the first connecting line.

By this structure, when the power having a correct direction is output from the power output device side to the electric load side (down stream side) the power can be output to the electric load because the rectifier element does not pass current. On the other hand when the power having the inverse direction is output from the power output device side to the electric load side, the rectifier element pass the current.

As a result, it is possible to prevent input of the power having the inverse direction to the electric load by making ease of current passage in forward direction (direction in which the current passes) of the rectifier element enough larger than the electric load. Further, because the connector device is disposed between the power output device and the electric load, even when the second connecting portion is deteriorated by repetition of connecting and disconnecting with many electric loads, for example, it will require only a replacement with a new connector device and it is not necessary to repair the power output device or the like.

At this point, the term "ground" used here is not necessarily restricted to the ground potential itself and contains a state of voltage which is smaller than the output voltage of the power output device. Further, as for the phrase "to pass current only in a direction from the second connecting line to the first connecting line", it is not necessarily restricted to strict meaning and it should be understood widely as far as it is within the purport of the present invention. For example, the present invention can be applicable to a case where slight current passes in a direction from the first connecting line to the second connecting line (slight current which passes when a reverse bias is applied to a diode, for example).

According to a second aspect of the present invention, it is preferable that the rectifier element is a diode having anode connected to the second connecting line and cathode connected to the first connecting line in the above described first aspect of the present invention. By this structure it is possible to realize easily above described structure by utilizing a rectifying function that the diode has.

According to a third aspect of the present invention, it is preferable that the electric load is a DC lamp which passes current from the positive terminal side to the negative terminal side in the above described first aspect of the present invention. By this structure when the DC lamp is connected to the power output device, it is possible to prevent output of the power having the inverse direction to the DC lamp by disposing the connector device between the power output device and the DC lamp.

To attain the above described second object a power detecting apparatus in accordance with a fourth aspect of the present invention includes: the connector device according to above described first aspect of the present invention; the power output device which is connected to the connector device; and a power detecting means which detects power that is output by the power output device to the first connecting portion side, and the power detecting apparatus is characterized by a structure in which the power detecting apparatus detects power which is output to the electric load that is connected to the second connecting portion. The power detecting apparatus is also useful.

By this structure it becomes possible to judge whether the electric load is appropriate or not, for example, by detecting the power of the electric load. Further, it becomes possible to prevent output of the power having the inverse direction to the electric load by disposing the connector device.

According to a fifth aspect of the present invention it is preferable that the power output device further includes a short protect means which stops output of the power when the output terminal and the ground terminal become substantially a short circuit state in the above described fourth aspect of the present invention.

In the rectifier element of the connector device, there is a possibility that the first connecting line and the second connecting line become substantially a short circuit state (and as a result, the output terminal and the ground terminal of the power output device become substantially a short circuit state) if impedance in a forward direction is enough small. When the output terminal and the ground terminal of the power output device become substantially a short circuit state, the power output device can stop output of the power by this structure, therefore it becomes possible to prevent problem such as a breakage of the respective circuits or the like by large current as much as possible.

According to a sixth aspect of the present invention it is preferable that the connector device outputs direct current power which is input to the power input terminal from the power output terminal, while the connector device prevents output of the direct current power from the output side ground terminal which is input to the input side ground terminal in the above described first aspect of the present invention.

To attain the above described second object a power detecting apparatus in accordance with a seventh aspect of the present invention includes: a connector device including a first connecting portion which has a power input terminal and an input side ground terminal, a second connecting portion which has a power output terminal and an output side ground terminal, which is characterized by a structure in that the power output terminal is connected to a positive terminal, and the output side ground terminal is connected to a negative terminal, respectively, the power input terminal and the power output terminal are connected by a first connecting line, the input side ground terminal and the output side ground terminal are connected by a second connecting line, and the first connecting line and the second connecting line are connected via a diode having anode connected to the second connecting line and cathode connected to the first connecting line; a power output device including an output terminal to output a prescribed power, a ground terminal and a short protect means which stops output of the power when the output terminal and the ground terminal become substantially a short circuit state, which is characterized by a structure in that the output terminal is connected to the power input terminal and the ground terminal is connected to the input side ground terminal, respectively; and a power detecting means for detecting the power which is output by the power output device via the connector device to a DC lamp that has a positive terminal and a negative terminal to pass current from the positive terminal to the negative terminal. By this power detecting apparatus it is possible to realize merit which is caused by the structures of the above described aspects of the present invention.

A testing method for an electric load in accordance with an eighth aspect of the present invention includes: a first step to connect the electric load to the second connecting portion in the power detecting apparatus according to the above described fourth aspect of the present invention, a second step using the power detecting means to detect the power which is output by the power output device to the first connecting portion side in the connected state of the above described first step, and a third step to disconnect the connection made in the above described first step after the detection is completed. By this testing method for the electric load of the eighth aspect of the present invention, it is possible to attain the power confirming test while avoiding a problem that the power having the inverse direction flows into the electric load. At this point, the testing method may be applied as a method to test resistance of the electric load, for example.

The above described and other objects and features of the present invention will become clearer by below description about the preferred embodiment of the present invention with reference to the attached drawings.

DESCRIPTION OF THE PREFERRED EMBODIMENTS

Hereinafter, a power detecting apparatus which is utilized for a test by supplying power to a DC lamp for a projector and by confirming a state of power at the time (power confirming test), will be described as one embodiment of the present invention. A schematic structure diagram of the power detecting apparatus is shown in FIG. 1.

Figure 1:
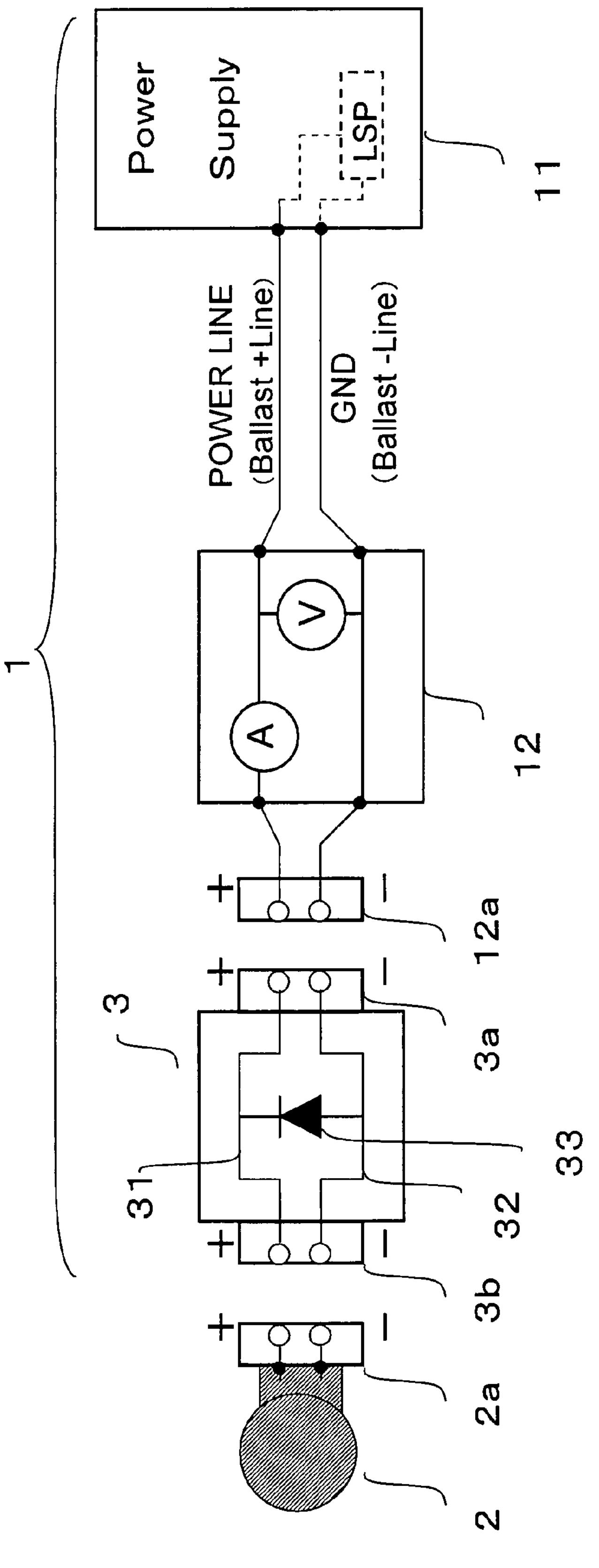
FIG. 1 is a block diagram of a power detecting apparatus according to the one embodiment of the present invention.

As shown in FIG. 1, the power detecting apparatus 1 is provided with a power supply 11, a power meter 12, and a connector device 3. The power supply 11 includes a power line (Ballast +Line) to output a prescribed power (for example, corresponding to a constant voltage of 380V) and a ground line (Ballast −Line) and it supplies a direct current power to a down stream side when a power switch (not shown) is turned on.

Figure 2:
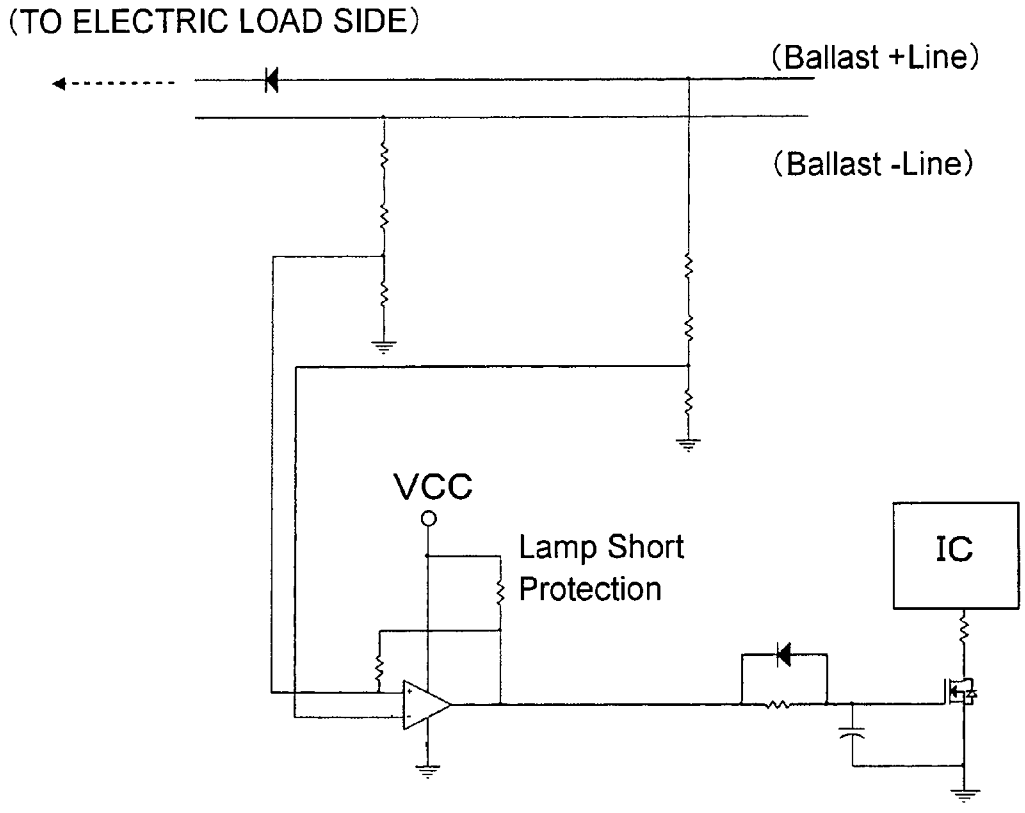
FIG. 2 is a diagram to show one example of a circuit to realize a lamp short protect (LSP) function.

Further, the power supply 11 incorporates a circuit to realize a lamp short protect (LSP) function. The LSP function is configured to stop supplying of the power when it detects that the power line and the ground line become substantially a short circuit state, and to protect circuits connected to the down stream side. At this point, the circuit shown in FIG. 2 is an example of circuit to realize the LSP function. Because the LSP function itself is a publicly known technology, detailed explanation for it will be omitted.

The power meter 12 has both functions to correspond to an ampere meter and a voltage meter and it detects the power which is supplied from an up stream side to the down stream side. Further, the power meter 12 is connected to the power line and the ground line of the power supply 11 in the up stream side. In addition, the power meter 12 has a connector 12*a* to couple with a connector 3*a* of the connector device 3 in the down stream side. The power line is connected to a positive terminal of the connector 12*a*, and the ground line is connected to a negative terminal of the connector 12*a*.

The connector device 3 has the connector 3*a* which can couple with the connector 12*a* of the power meter 12 in the up stream side in a detachable manner, and a connector 3*b* which can couple with a connector 2*a* of a DC lamp 2 in the down stream side in a detachable manner. Further, the positive terminal of the connector 3*a* and the positive terminal of the connector 3*b* are connected by a first connecting line 31, and the negative terminal of the connector 3*a* and the negative terminal of the connector 3*b* are connected by a second connecting line 32.

In addition, the first connecting line 31 and the second connecting line 32 are connected via a high voltage durable diode 33 having anode connected to the second connecting line 32 and cathode connected to the first connecting line 31. This high voltage durable diode 33 plays a role as a rectifier element which passes current only in a direction from the first connecting line 31 to the second connecting line 32.

At this point, the high voltage durable diode 33 is a type of diode which is not broken down even when reverse bias in the same range of output voltage of the power supply 11, is applied. As for the forward direction, the high voltage durable diode 33 has enough good current conductivity in comparison with the electric load which is to be tested (in this case the DC lamp 2).

The DC lamp 2 which is an object of the power confirming test, includes the connector 2*a* having a positive terminal and a negative terminal. Further, the DC lamp 2 emits a light by the direct current power which is input from the positive terminal side, and it is conceivable that the DC lamp 2 is one of an electric load (a resistance) in a circuit. At this point, in the DC lamp 2 the direction in which the DC power should be supplied is defined and if a power having the inverse direction (a direction from the negative terminal to the positive terminal) is input, there is a possibility of causing a problem that the DC lamp 2 is broken or the like.

Figure 3:
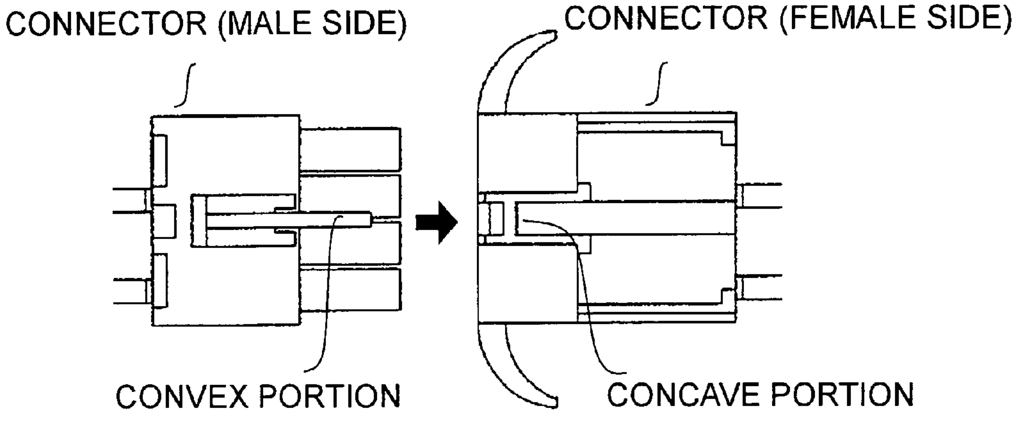
FIG. 3 is a diagram to show a shape of a pair of connectors.
Figure 4:
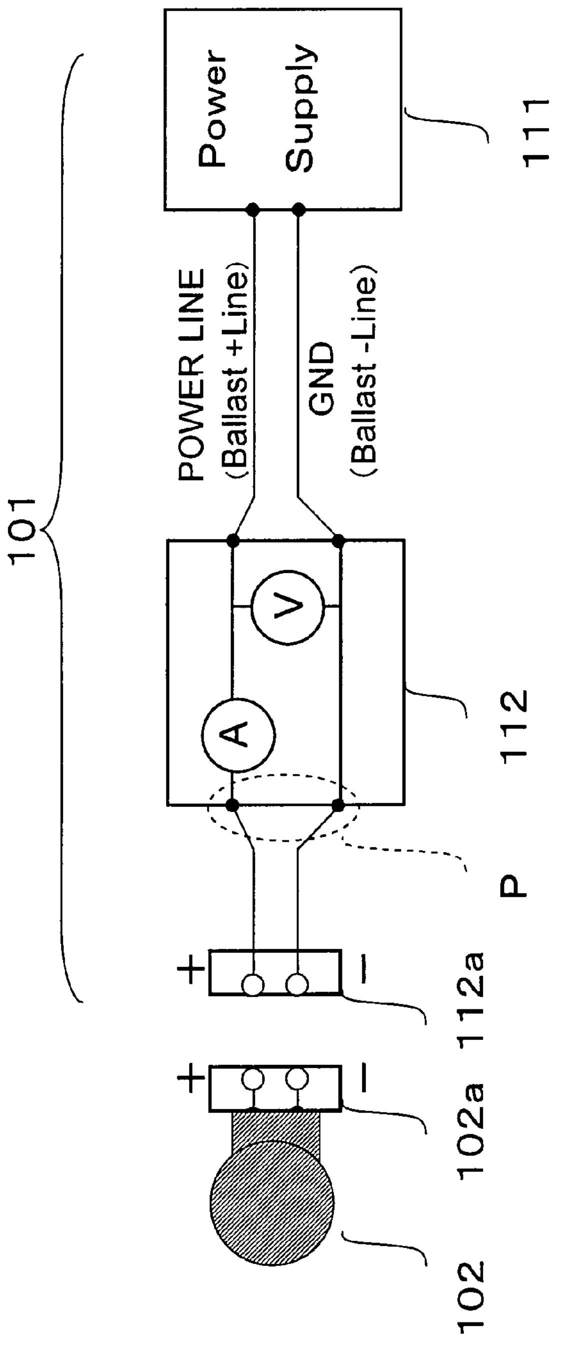
FIG. 4 is a block diagram of one example of a power detecting apparatus according to the conventional technology.

Further, in the connectors which connect respective devices or the object to be tested (12*a*, 3*a*, 3*b*, 2*a*), a pair of connectors to be coupled with each other, that is, 12*a* and 3*a*, 3*b* and 2*a* are configured to connect inevitably with same poles such as positive (+) terminal to positive terminal and negative (−) terminal to negative terminal. This is realized by making the connectors to have a concave portion and a convex portion as shown in FIG. 3, for example, and by making them coupled with each other when connection is performed.

Next, steps of the power confirming test for the DC lamp 2 which utilizes the power detecting apparatus 1 that has the above described structure, will be described. First, the connectors which make the pairs each other (12*a* and 3*a*, 3*b* and 2*a*) are connected in a state where a power switch is turned off in the power supply 11.

Then the power switch is turned on and direct current power is supplied to the down stream side including the DC lamp 2. At this time, almost no current passes through the high voltage durable diode 33 in the connector device 3 because it becomes a state in which a reverse bias is applied. As a result, the power supplied from the power supply 11 is input to the DC lamp 2.

In this state the test is made so that detecting result of the power meter 12 is confirmed. At this point, if it is assumed that the voltage is V and resistance of the DC lamp 2 is R when the power supply 11 is a constant voltage power supply, power W which is designated by about $V^2/R$ is detected by the power meter. By this arrangement if a resulted value of W is larger or smaller than a predetermined normal range it can be confirmed that the DC lamp 2 is not a good product with respect to the resistance value, and if a resulted value of W is within the normal range, it can be confirmed that the DC lamp 2 is a good product.

When such confirming step has been completed, the DC lamp 2 is disconnected from the connector device 3 and another DC lamp 2 to be tested next is connected to the connector device. By repeating the power confirming step and connecting and disconnecting steps, the power confirming test for a plurality of DC lamps 2 can be performed.

Next, a case in which an output power of the power detecting apparatus 1 has a reverse direction by any reason, that is to say, a case in which the power is output from the negative terminal side of the connector 12*a* in the power meter 12, will be described. In such a case, a prescribed voltage is applied to the second connecting line 32 from the power supply 11 side in the connector device 3 which is connected to the power meter 12.

As a result a forward direction bias is applied to the high voltage durable diode 33, and the first connecting line 31 and the second connecting line 32 become substantially the short circuit state. At this point, though the DC lamp 2 is connected to the connector device 3, almost no current passes through the DC lamp 2 because the high voltage durable diode 33 is easier enough to pass the current than the DC lamp 2.

As above described, in the present embodiment it is possible to prevent an input of the power having the inverse direction to the DC lamp 2 even if a direction of the output power from the power detecting apparatus 1 is reversed, and as a result it becomes possible to prevent the problem such as breakage or the like of the DC lamp 2.

Further as above described, because the power supply 11 has the LSP function, the supply of power is stopped when the high voltage durable diode 33 becomes substantially the short circuit state. As a result, it becomes possible to prevent problem such as a breakage of the respective circuits or the like by large current as much as possible.

As above described, the connector device 3 according to the present embodiment includes the connector 3*a* (a first connecting portion) and the connector 3*b* (a second connecting portion). Further, the power output device 11 is connected with the DC lamp 2 by connecting the connector 3*a* to the power supply 11 (a power output device) having a positive terminal (an output terminal) to output a prescribed power and a negative terminal (a ground terminal) and connecting the connector 3*b* to the DC lamp 2 (the electric load) having the positive terminal and the negative terminal.

In addition, the connector 3*a* has the positive terminal (a power input terminal) and the negative terminal (an input side ground terminal), the positive terminal of the power output device 11 side is connected to the positive terminal of the connector 3*a* and the negative terminal of the power output device 11 side is connected to the negative terminal of the connector 3*a*, respectively. Further the connector 3*b* has the positive terminal (a power output terminal) and the negative terminal (an output side ground terminal), the positive terminal of the DC lamp is connected to the positive terminal of the connector 3*b*, and the negative terminal of the DC lamp is connected to the negative terminal of the connector 3*b*, respectively.

The positive terminal of the connector 3*a* and the positive terminal of the connector 3*b* are connected by the first connecting line 31 and the negative terminal of the connector 3*a* and the negative terminal of the connector 3*b* are connected by the second connecting line 32. Further the first connecting line 31 and the second connecting line 32 are connected via the rectifier element (the high voltage durable diode 33) which passes current only in a direction from the second connecting line 32 to the first connecting line 31.

By these arrangement when the power having a correct direction is output from the power output device 11 side to the DC lamp 2 side (down stream side), the high voltage durable diode 33 does not pass current by the connector device 3, therefore the power can be output to the DC lamp 2. On the other hand when the power having the inverse direction is output from the power output device 11 side to the DC lamp 2 side, the high voltage durable diode 33 passes the current.

Further, because easiness for current pass in forward direction (direction in which current should pass) of the high voltage durable diode 33 is made enough larger than the DC lamp 2, the power having the inverse direction is prevented from being input to the DC lamp 2. Further, because the connector device 3 is disposed between the power output device 11 and the DC lamp 2, even when the connector 3*b* is deteriorated by repetition of connecting and disconnecting with many DC lamps 2, for example, it will require only a replacement with a new connector device 3 and it is not necessary to repair the power output device 11 or the like.

Further, when the present embodiment is viewed as the power detecting apparatus to perform the power confirming test for the DC lamp 2, the power detecting apparatus includes the connector device 3, and the power supply 11 (the power output device) which is connected to the connector device 3. At this point the power detecting apparatus 1 includes also a power detecting means (the power meter 12) to detect the power which is output to the connector 3*a* side.

Therefore according to the power detecting apparatus 1 it becomes possible to judge whether inner resistance of the DC lamp 2 is appropriate or not by detecting the power of the DC lamp 2. Further, it becomes possible to prevent output of the power having the inverse direction to the DC lamp 2 by disposing the connector device 3.

The present invention is not limited to the above described embodiment, and various modification can be applied without departing from the purport of the present invention.

When the power having the correct direction is output from the power output device side to the electric load side (down stream side), the rectifier element does not pass current by the connector device according to the present invention which is described above as the present embodiment, therefore the power can be output to the electric load. On the other hand when the power having the inverse direction is output from the power output device side to the electric load side, the rectifier element passes the current.

As a result, by making easiness for current pass in the forward direction (direction in which current should pass) of the rectifier element enough larger than the electric load, it is possible to prevent input of the power having the inverse direction to the electric load. Further, because the connector device is disposed between the power output device and the electric load, even when the second connecting portion is deteriorated by repetition of connecting and disconnecting with many electric loads, for example, it will require only a replacement with a new connector device and it is not necessary to repair the power output device or the like.

By the power detecting apparatus according to the present invention, it becomes possible to judge whether the electric load is appropriate or not, for example, by detecting the power of the electric load. Further, it becomes possible to prevent output of the power having the inverse direction to the electric load by disposing the connector device.

What is claimed is:

1. A power detecting apparatus comprising:

a connector device for connecting a power output device and an electric load to each other, the connector device comprising:

a first connecting portion to which the power output device having an output terminal to output a prescribed power and a ground terminal is connected; and a second connecting portion to which the electric load having a positive terminal and a negative terminal is connected, wherein the first connecting portion has a power input terminal to which the output terminal is connected and an input side ground terminal to which the ground terminal is connected respectively, the second connecting portion has a power output terminal to which the positive terminal is connected and an output side ground terminal to which the negative terminal is connected respectively, the power input terminal and the power output terminal are connected by a first connecting line, the input side ground terminal and the output side ground terminal are connected by a second connecting line, and the first connecting line and the second connecting line are connected via a rectifier element which passes current only in a direction from the second connecting line to the first connecting line; and a power detecting means which detects power which is output by the power output device to the first connecting portion side, wherein the power detecting apparatus detects power which is output to the electric load that is connected to the second connecting portion.

2. The power detecting apparatus according to claim 1, wherein the power output device further comprising a short protect means which stops output of the power when the output terminal and the ground terminal become substantially a short circuit state.

3. A power detecting apparatus comprising:

a connector device including a first connecting portion which has a power input terminal and an input side ground terminal, and a second connecting portion which has a power output terminal and an output side ground terminal, wherein the power output terminal is connected to a positive terminal, and the output side ground terminal is connected to a negative terminal, respectively, the power input terminal and the power output terminal are connected by a first connecting line, the input side ground terminal and the output side ground terminal are connected by a second connecting line, and the first connecting line and the second connecting line are connected via a diode having anode connected to the second connecting line and cathode connected to the first connecting line;

a power output device including an output terminal to output a prescribed power, a ground terminal, and a short protect means which stops output of the power when the output terminal and the ground terminal become substantially a short circuit state, wherein the output terminal is connected to the power input terminal and the ground terminal is connected to the input side ground terminal, respectively; and a power detecting means for detecting the power which is output by the power output device via the connector device to a DC lamp that has a positive terminal and a negative terminal to pass current from the positive terminal side to the negative terminal side.

4. A testing method for an electric load comprising:

a first step to connect the electric load to the second connecting portion in the power detecting apparatus according to claim 1;

a second step using the power detecting means to detect the power which is output by the power output device to the first connecting portion side in the connected state of the above described first step; and a third step to disconnect the connection made in the above described first step after the detection is completed.

5. The testing method according to claim 4, wherein the method is performed to test resistance of the electric load.

6. The power detecting apparatus according to claim 1, wherein the rectifier element of the connector device is a diode having anode connected to the second connecting line and cathode connected to the first connecting line.

7. The power detecting apparatus according to claim 1, wherein the electric load is a DC lamp which passes current from the positive terminal side to the negative terminal side.

8. The power detecting apparatus according to claim 1, wherein the connector device outputs direct current power that is input to the power input terminal from the power output terminal, while the connector device prevents output of the direct current power from the output side ground terminal which is input to the input side ground terminal.

* * * * *